(12) United States Patent
Horiuchi et al.

(10) Patent No.: US 7,470,480 B2
(45) Date of Patent: Dec. 30, 2008

(54) SOLID ELECTROLYTE FUEL-CELL DEVICE

(75) Inventors: Michio Horiuchi, Nagano (JP);
Shigeaki Suganuma, Nagano (JP); Misa Watanabe, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 850 days.

(21) Appl. No.: 10/913,339

(22) Filed: Aug. 9, 2004

(65) Prior Publication Data

US 2005/0037251 A1 Feb. 17, 2005

(30) Foreign Application Priority Data

Aug. 11, 2003 (JP) .............................. 2003-207167

(51) Int. Cl.
*H01M 8/04* (2006.01)
*H01M 8/12* (2006.01)

(52) U.S. Cl. .............................. 429/20; 429/26; 429/30

(58) Field of Classification Search .................. None
See application file for complete search history.

(56) References Cited

U.S. PATENT DOCUMENTS

| 3,492,162 | A | 1/1970 | Consiglio et al. |
| 2003/0054222 | A1 | 3/2003 | Horiuchi et al. |

FOREIGN PATENT DOCUMENTS

| EP | 1414094 | 4/2004 |
| EP | 1467427 | 10/2004 |
| JP | 62-154575 | 7/1987 |
| JP | 6-196176 | 7/1994 |
| JP | 06-196176 | * 7/1994 |
| JP | 06196176 | 7/1994 |
| JP | 8-259346 | 10/1996 |
| JP | 11-162492 | 6/1999 |
| JP | 2000-243412 | 9/2000 |
| JP | 2002-151098 | 5/2002 |
| JP | 2003-92124 | 3/2003 |
| JP | 2004-500691 | 1/2004 |
| WO | WO 01/73881 | 10/2001 |

OTHER PUBLICATIONS

European Search Report Issued Nov. 17, 2005 for European Application No. 04254786.9.
Japanese Patent Office Action, mailed Oct. 7, 2008 and issued in corresponding Japanese Patent Application No. 2003-207167.

* cited by examiner

*Primary Examiner*—John S Maples
(74) *Attorney, Agent, or Firm*—Staas & Halsey LLP (57) ABSTRACT

The present invention is directed to the provision of a solid electrolyte fuel-cell device that achieves increased durability, increased power generation efficiency, and easy utilization of heat, by making provisions to apply flames over the entire surface of an anode layer formed on a solid electrolyte substrate. Each individual fuel cell is constructed by forming a cathode layer and an anode layer on opposite surfaces of a plate-like solid electrolyte substrate. Power generation efficiency is increased by making provisions to ensure that a plurality of flames formed by burning a fuel supplied from a fuel supply pipe are applied over the entire surface of the anode layer. When a coolant pipe is provided in an interlaced fashion with the fuel supply pipe, not only can the heating of the fuel supply pipe by the burning of the fuel be suppressed, but also the waste heat can be utilized.

9 Claims, 6 Drawing Sheets

PRIOR ART

GAS

SOLID ELECTROLYTE FUEL-CELL DEVICE

CROSS-REFERENCE TO RELATED APPLICATION

This application claims the priority of Japanese Patent Application Number 2003-207167, filed on Aug. 11, 2003.

BACKGROUND OF THE INVENTION

1. Field of the Invention

The present invention relates to a solid electrolyte fuel-cell device and, more particularly, to a solid electrolyte fuel-cell device comprising a cathode layer and an anode layer formed on a solid electrolyte substrate, wherein a simple structure that does not require hermetic sealing is employed to achieve a compact and thin construction while, at the same time, achieving increased power generation efficiency and good utilization of heat.

2. Description of the Related Art

Heretofore, fuel cells have been developed and commercially implemented as a low-pollution power generating means to replace traditional power generation means such as thermal power generation means, or as an electric energy source for electric vehicles that replaces the internal combustion engine which uses gasoline, or the like, as the fuel. Regarding such fuel according to the method of power generation, one being the type of fuel cell that uses a solid electrolyte. As one example of the fuel cell that uses a solid electrolyte, a fuel cell is known that uses a calcined structure made of yttria($Y_2O_3$)-doped stabilized zirconia as an oxygen ion conducting solid electrolyte layer. This type of fuel cell comprises a cathode layer formed on one surface of the solid electrolyte layer and an anode layer formed on the opposite surface thereof, and oxygen or an oxygen-containing gas is fed to the cathode layer, while a fuel gas such as methane is fed to the anode layer.

In this fuel cell, the oxygen ($O_2$) fed to the cathode layer is converted into oxygen ions ($O^{2-}$) at the boundary between the cathode layer and the solid electrolyte layer, and the oxygen ions are conducted through the solid electrolyte layer into the anode layer where the ions react with the fuel gas, for example, a methane gas ($CH_4$), fed to the anode layer, producing water ($H_2O$), carbon dioxide ($CO_2$), hydrogen ($H_2$), and carbon monoxide ($CO$). In this reaction process, as the oxygen ions release electrons, a potential difference occurs between the cathode layer and the anode layer. Here, when the cathode layer and the anode layer are electrically connected by a lead wire, the electrons in the anode layer flow into the cathode layer via the lead wire, and the fuel cell thus generates electricity. The operating temperature of this type of fuel cell is about 1000° C.

However, this type of fuel cell requires the provision of separate chambers, one being an oxygen or oxygen-containing gas supply chamber on the cathode layer side and the other a fuel gas supply chamber on the anode layer side; furthermore, as the fuel cell is exposed to oxidizing and reducing atmospheres at high temperatures, it has been difficult to increase the durability of the fuel cell.

On the other hand, there has been developed a fuel cell of the type that comprises a cathode layer and an anode layer formed on opposite surfaces of a solid electrolyte layer, and that generates an electromotive force between the cathode layer and the anode layer by placing the fuel cell in a mixed fuel gas consisting of a fuel gas, for example, a methane gas, and an oxygen gas. The principle of generating an electromotive force between the cathode layer and the anode layer is the same for this type of fuel cell as for the above-described separate-chamber type fuel cell but, as the whole fuel cell can be exposed to substantially the same atmosphere, the fuel cell can be constructed as a single-chamber type cell to which the mixed fuel gas is supplied, and this serves to increase the durability of the fuel cell.

However, in this single-chamber fuel cell also, as the fuel cell has to be operated at a high temperature of about 1000° C., there is the danger that the mixed fuel gas may explode. Here, if the oxygen concentration is reduced to a level lower than the ignitability limit to avoid such danger, there occurs the problem that carbonization of the fuel, such as methane, progresses and the cell performance degrades. In view of this, there is proposed, for example, in Japanese Unexamined Patent Publication No. 2003-92124, a single-chamber fuel-cell device that can use a mixed fuel gas whose oxygen concentration is adjusted so as to be able to prevent the progress of carbonization of the fuel, while at the same time, preventing the explosion of the mixed fuel gas.

The above proposed fuel-cell device is of the type that is constructed by housing individual fuel cells in a single chamber; on the other hand, Japanese Unexamined Patent Publication No. H06-196176, for example, proposes an apparatus that does not house a fuel cell in such a chamber, and that generates electricity by placing a solid electrolyte fuel cell in or near a flame and thereby holding the solid electrolyte fuel cell at its operating temperature.

The earlier described single-chamber fuel-cell device obviates the necessity of strictly separating the fuel and the air, as was the case with conventional solid electrolyte fuel-cell devices, but has to employ a hermetically sealed construction. Further, to increase the electromotive force, a plurality of plate-like solid electrolyte fuel cells are stacked one on top of another and connected together using an interconnect material having high heat resistance and high electrical conductivity so as to be able to operate at high temperatures. As a result, the single-chamber fuel-cell device constructed from a stack of plate-like solid electrolyte fuel cells has the problem that the construction is not only large but also costly. Furthermore, since the temperature is gradually raised to the high operating temperature in order to prevent cracking of the plate-like solid electrolyte fuel cells, this type of single-chamber fuel-cell device requires a significant startup time, thus being more difficult to operate.

In contrast, the electricity generating apparatus described above employs the solid electrolyte fuel cell of the type that directly utilizes a flame; this type of fuel cell has the characteristic of being an open type, the solid electrolyte fuel cell not needing to be housed in a hermetically sealed container. As a result, this type of fuel cell can reduce the startup time, is simple in structure, and is therefore advantageous when it comes to reducing the size, weight, and cost of the fuel cell. Further, since the flame is directly used, this type of fuel cell can be incorporated in a conventional combustion apparatus or an incinerator or the like, and is thus expected to be used as an electricity supply apparatus.

However, in this type of fuel cell, as the anode layer is formed on the outer circumference of a tubular solid electrolyte layer, radical components due to the flame are not supplied, in particular, to the upper half of the anode layer, and effective use cannot be made of the entire surface of the anode layer formed on the outer circumference of the tubular solid electrolyte layer. This has degraded the power generation efficiency. There has also been the problem that, as the solid electrolyte fuel cell is directly heated by the flame, cracking tends to occur due to rapid changes in temperature, and the solid electrolyte fuel cell, if cracked, eventually disintegrates into pieces, resulting in an inability to generate electricity.

Accordingly, to reduce the size and cost of the fuel-cell device, the present invention employs the type of solid electrolyte fuel cell that directly utilizes a flame, and an object of the invention is to provide a solid electrolyte fuel-cell device that can achieve increased durability, increased power generation efficiency, and easy utilization of heat, by making provisions to apply flames over the entire surface of the anode layer formed on the solid electrolyte layer, while preventing the occurrence of cracking.

SUMMARY OF THE INVENTIONS

To solve the above-described problems, the solid electrolyte fuel-cell device of the present invention comprises: a solid electrolyte substrate; a cathode layer formed on one surface of the solid electrolyte substrate; and an anode layer formed on a surface of the solid electrolyte substrate opposite from the one surface, wherein a flame formed by combustion of a fluid fuel is applied to the anode layer and air is supplied to the cathode layer.

The cathode layer and the anode layer are each formed from a porous material, and a metal mesh or metal wire is embedded in or fixed to a surface of each of the cathode layer and the anode layer.

Further, in the solid electrolyte fuel-cell device, a plurality of fuel supply pipes, each provided with a plurality of holes, are arranged in parallel to a surface of the anode layer, the flame is formed by combustion of the fluid fuel at the plurality of holes, and the entire surface of the anode layer is exposed to the flame.

The plurality of fuel supply pipes are connected together, forming a single continuous flow path for the fluid fuel, and heat exchange medium supply pipes are arranged in an interlaced fashion between the plurality of fuel supply pipes.

Further, a fuel cell unit is formed using a solid electrolyte fuel cell, which comprises the solid electrolyte substrate, the cathode layer, and the anode layer, and a partition plate on one surface of which are mounted the plurality of fuel supply pipes and the plurality of heat exchange medium supply pipes, the partition plate being disposed a prescribed distance away from the solid electrolyte fuel cell, and a plurality of such fuel cell units are arranged, one spaced apart from another at a prescribed distance and tilted by a prescribed angle, wherein a gap between the partition plate of each of the fuel cell units and the cathode layer of an adjacent one of the fuel cell units provides an air flow passage. Here, at least a lowermost portion of each of the tilted fuel cell units is closed.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENT

An embodiment of a solid electrolyte fuel-cell device according to the present invention will be described below with reference to the drawings. However, before proceeding to the description of the solid electrolyte fuel-cell device of the present embodiment, prior art solid electrolyte fuel-cell devices, which provide the basis for the solid electrolyte fuel-cell device of the present embodiment, will be described in order to clarify the features and advantages of the present embodiment.

Figure 6A:
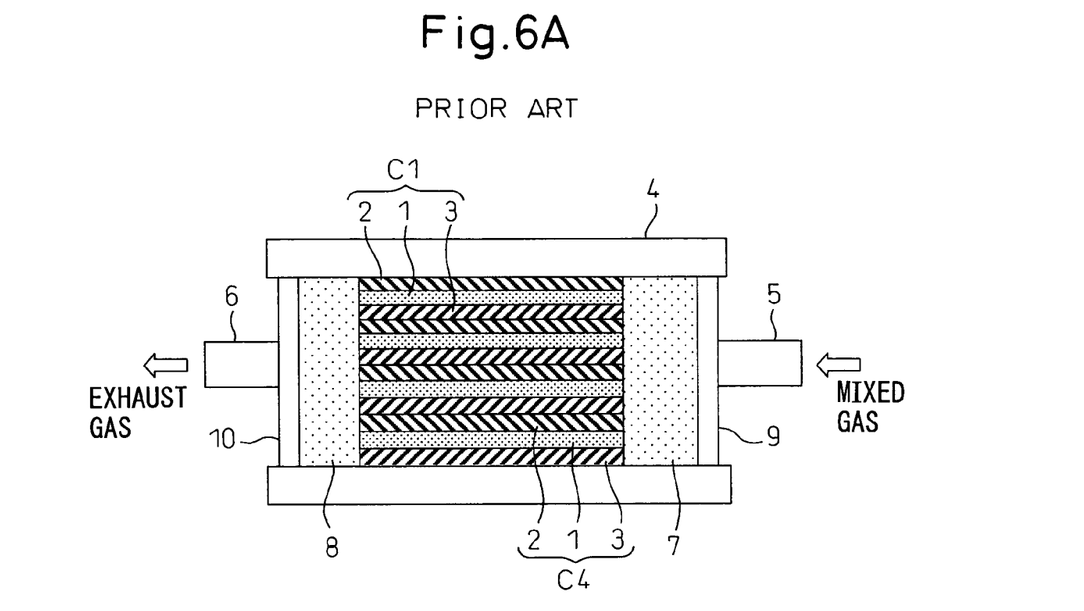
FIGS. 6A and 6B are diagrams schematically showing the structures of prior art solid electrolyte fuel-cell devices that use mixed fuel gas.
Figure 6B:
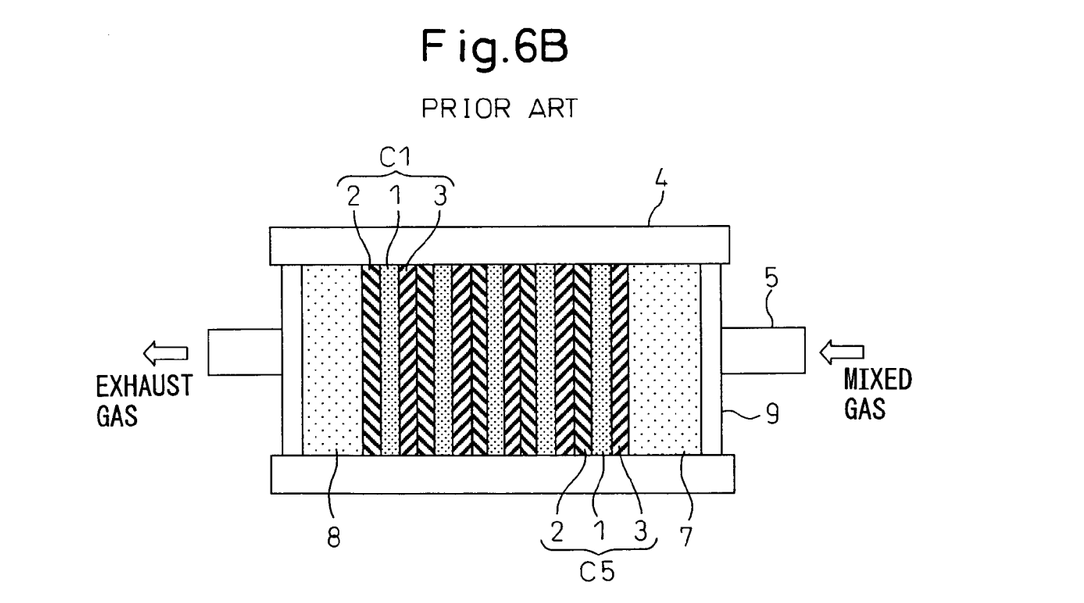

FIGS. 6A and 6B show the structures of the single-chamber fuel-cell devices proposed in the prior art. The fuel-cell device shown in FIG. 6A has a structure in which individual fuel cells each containing a solid electrolyte layer are stacked one on top of another with each cell oriented parallel to the flow direction of the mixed fuel gas. Each fuel cell comprises a solid electrolyte layer 1 of a closely compacted structure and a cathode layer 2 and an anode layer 3 as porous layers formed on opposite surfaces of the solid electrolyte layer 1, and the plurality of fuel cells C1 to C4 of identical structure are stacked in a ceramic container 4. Then, the fuel cells are hermetically sealed in the container 4 by adding fillers 7 and 8 and closing them with end plates 9 and 10.

The container 4 is provided with a supply pipe 5 for supplying the mixed fuel gas containing oxygen and a fuel such as methane and an exhaust pipe 6 for ejecting the exhaust gas. Vacant spaces in the container 4, where the mixed fuel gas and the exhaust gas flow, i.e., the areas in the container 4 other than the area occupied by the fuel cells, are filled with the fillers 7 and 8, and a suitable gap is provided therebetween, thereby preventing the mixed fuel gas from igniting even when a mixed fuel gas within the ignitability limit is contained therein when the fuel-cell device is operated.

The basic structure of the fuel-cell device shown in FIG. 6B is the same as that of the single-chamber fuel-cell device shown in FIG. 6A, except that the individual fuel cells each containing a solid electrolyte layer are stacked in the axial direction of the container 4 with each cell oriented perpendicularly to the flow direction of the mixed fuel gas. In this case, each fuel cell comprises a solid electrolyte layer 1 of a porous structure and a cathode layer 2 and an anode layer 3 as porous layers formed on opposite surfaces of the solid electrolyte layer 1, and the plurality of fuel cells C1 to C5 of identical structure are stacked in the container 4.

Figure 7:
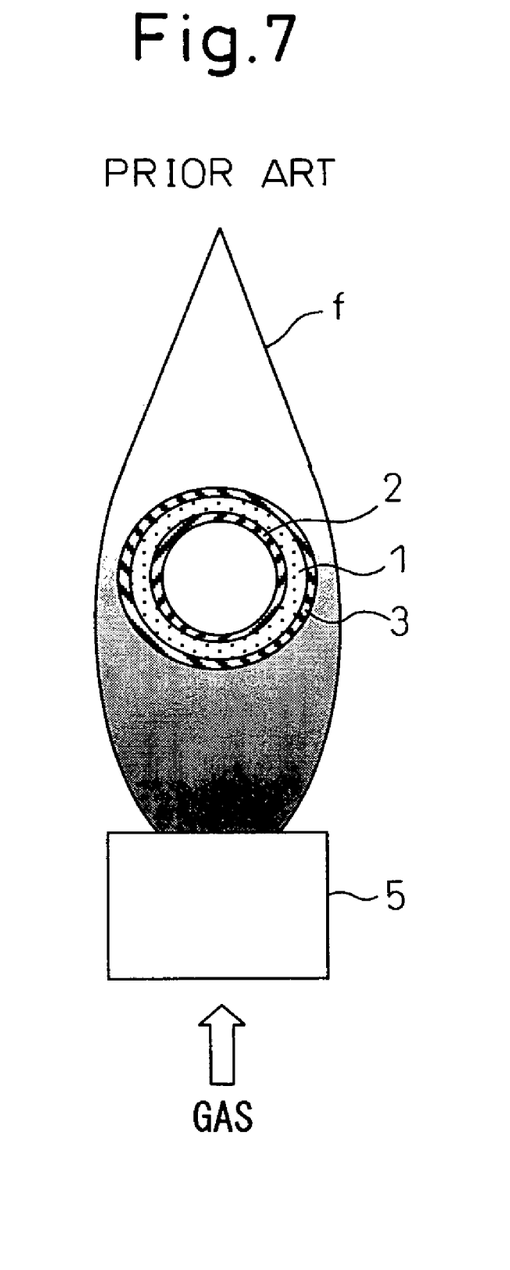
FIG. 7 is a diagram for explaining the structure of a prior art solid electrolyte fuel cell that uses a flame.

On the other hand, an electric power generating apparatus using a fuel cell that is not housed in a single chamber but directly utilizes a flame, as previously described, is shown in FIG. 7. The fuel cell used in the electric power generating apparatus shown in FIG. 7 comprises a zirconia solid electrolyte layer 1 formed in a tubular structure, an anode layer 3 as a fuel electrode formed on the outer circumference of the tubular structure, and a cathode layer as an air electrode formed on the inner circumference of the tubular structure. This solid electrolyte fuel cell is operated with the anode layer 3 exposed to a reducing flame portion of a flame f generated from a combustion apparatus 5 to which the fuel gas is supplied. In this arrangement, radical components, etc. present in the reducing flame are utilized as the fuel, while air is supplied by convection or diffusion to the cathode layer 2 inside the tubular structure, and the fuel cell thus generates electricity.

Figure 1A:
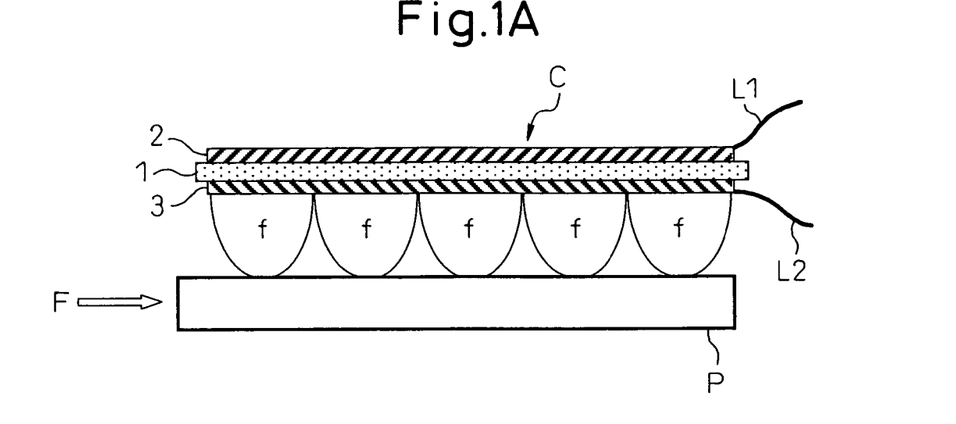
FIGS. 1A and 1B are diagrams for explaining an embodiment of a solid electrolyte fuel-cell device according to the present invention.
Figure 1B:
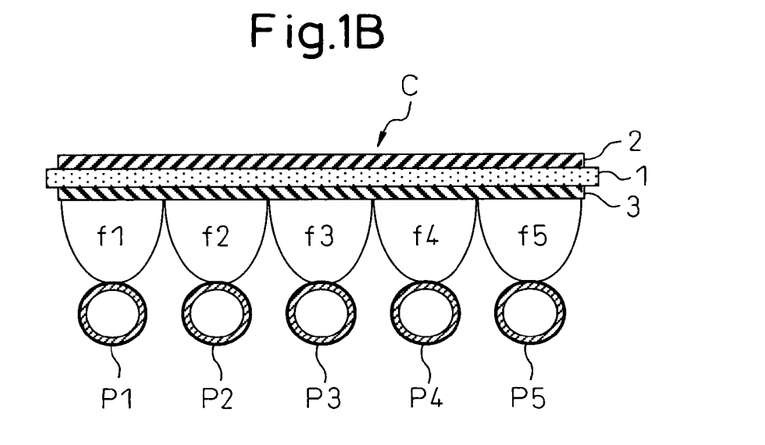

Next, the embodiment of the solid electrolyte fuel-cell device according to the present invention will be described with reference to the drawings. FIGS. 1A and 1B show the structure of the solid electrolyte fuel-cell device according to the present embodiment. FIG. 1A is a side view schematically showing the structure of the solid electrolyte fuel-cell device, and FIG. 1B is a side view as viewed from a direction at right angles to the direction of view in FIG. 1A.

In the prior art solid electrolyte fuel-cell device that directly utilizes a flame, as the solid electrolyte layer is formed in the shape of a tube, the flame has not been applied efficiently to the anode layer formed on the outer circumference of the solid electrolyte layer. In contrast, the solid electrolyte fuel-cell device of the present embodiment employs a solid electrolyte layer formed in the shape of a plate, for example, a thin plate-like solid electrolyte substrate. Then, a cathode layer (air electrode layer) and an anode layer (fuel electrode layer) are respectively formed on opposite surfaces of the solid electrolyte substrate, and provisions are made so that a fluid fuel that forms flames by combustion, for example, methane or the like in the case of a gaseous fuel, or methanol or the like in the case of a liquid fuel, can be supplied so as to apply the flames over the entire surface of the anode layer.

As shown in FIGS. 1A and 1B, the solid electrolyte fuel cell C in the fuel-cell device of the present embodiment comprises a flat plate-like solid electrolyte substrate 1 and a cathode layer 2 and an anode layer 3 formed on opposite surfaces of the solid electrolyte substrate 1, and electromotive force extracting lead wires L1 and L2 are attached to the cathode layer 2 and the anode layer 3, respectively. Below the solid electrolyte fuel cell C are arranged a plurality of fuel supply pipes P1 to P5 extending parallel to each other and spaced a prescribed distance away from the fuel cell C. The fuel supply pipes P1 to P5 are each provided with a plurality of holes, and the fuel such as a methane gas discharged from these holes is burned to form flames f or f1 to f5.

Here, the number of fuel supply pipes P or the spacing between them, the number of holes or the spacing of the holes, the distance between the fuel cell C and the fuel supply pipes P, etc. are suitably chosen so that the plurality of flames formed by combustion are uniformly applied over the entire surface of the anode layer and the radical components in the flames are supplied to the anode layer in an optimum condition.

Next, the detailed structure of the fuel cell C used in the solid electrolyte fuel-cell device of the present embodiment will be described. As shown in FIGS. 1A and 1B, the solid electrolyte fuel cell C of the present embodiment is formed in a flat plate-like structure, with the cathode layer 2 formed on one surface of the solid electrolyte substrate 1 and the anode layer 3 on the opposite surface thereof. Then, with the anode layer 3 disposed opposite the fuel supply pipes P and placed in or near the flames f, the fuel cell C operates to generate electricity.

The electricity generated by the solid electrolyte fuel cell C is extracted via the lead wires L1 and L2 brought out of the cathode layer 2 and the anode layer 3, respectively. The lead wires are formed from a heat-resistant platinum material or a platinum-containing alloy.

As the fuel cell C of the present embodiment is formed in a flat plate-like shape, the flames can be applied uniformly compared with the tubular type. Further, the anode layer 3 is disposed facing the flame side so that hydrocarbons, hydrogen, radicals (OH, CH, $C_2$, $O_2H$, $CH_3$), etc. present in the flames can be easily used as the fuel.

Further, the flat plate-like structure has the effect of being able to completely block the flames, as shown in FIGS. 1A and 1B; as a result, with the anode layer 3 disposed facing the flame side, the cathode layer 2 can be exposed to the atmosphere. In the open-type fuel cell C, this makes it easier for the cathode layer 2 to use the oxygen in the atmosphere, and the oxygen-rich condition can thus be maintained. In this case, an oxygen-containing gas (air, oxygen-rich gas, etc.) may be fed to the cathode layer 2 in order to enhance the oxygen utilization efficiency of the cathode layer 2.

The fuel cell C is placed in or near the flame, more preferably in the reducing flame near the base of the flame. When the fuel cell C is placed in the reducing flame, hydrocarbons, hydrogen, radicals, etc. present in the reducing flame can be efficiently used as the fuel; furthermore, the anode layer can be kept in a good condition even when it easily tends to degrade due to oxidation, and the durability can thus be maintained.

Any fuel that burns and oxidizes by forming a flame (a flammable fuel) can be used as the fuel for combustion. Phosphorous, sulfur, fluorine, chlorine, or their compounds may be used, but an organic substance that does not need exhaust gas treatment is preferable. Such organic fuels include, for example, gases such as methane, ethane, propane, and butane, gasoline-based liquids such as hexane, heptane, octane, alcohols such as methanol, ethanol, and propanol, ketons such as acetone, and various other organic solvents, edible oil, kerosene, etc. Of these fuels, a gaseous fuel is particularly preferable.

Further, the flame may be a diffusion flame or a premixed flame, but the premixed flame is preferred for use, because the diffusion flame is unstable and tends to incur degradation of the performance of the anode layer due to the production of soot. The premixed flame is advantageous as the flame is not only stable but the flame size is easily adjustable; in addition, the production of soot can be prevented by adjusting the fuel density.

For the solid electrolyte substrate 1, known materials can be used, examples including the following:
a) YSZ (yttria-stabilized zirconia), ScSZ (scandia-stabilized zirconia), and zirconia-based ceramics formed by doping these materials with Ce, Al, etc.
b) SDC (samaria-doped ceria), GDC (gadolinium-doped ceria), and other ceria-based ceramics.
c) LSGM (lanthanum gallate) and bismuth oxide-based ceramics.

For the anode layer 3, known materials can be used, examples including the following:
d) Cermet of nickel and a ceramic based on yttria-stabilized zirconia or scandia-stabilized zirconia or a ceramic based on ceria (SDC, GDC, YDC, etc.).
e) Sintered material composed principally of electrically conductive oxide (50% to 99% by weight) (electrically conductive oxide is, for example, nickel oxide with lithium dissolved in it).
f) Material given in d) or e) to which a metal made of a platinum-group element or rhenium or its oxide is added in an amount of 1% to 10% by weight.

Of these materials, d) and e) are particularly preferable.

The sintered material composed principally of electrically conductive oxide given in e) has excellent oxidation resistance, and therefore, can prevent defects resulting from the oxidation of the anode layer, such as separation of the anode layer from the solid electrolyte layer and degradation of power generation efficiency or inability to generate power due to the rise in the electrode resistance of the anode layer. For the electrically conductive oxide, lithium-dissolved nickel oxide is preferable. It will also be noted that high power generation performance can be obtained by adding a metal made of a platinum-group element or rhenium or its oxide to the material given in d) or e).

For the cathode layer 2, known materials can be used, examples including lanthanum manganite doped with an element, such as strontium (Sr), from group III of the periodic table (for example, lanthanum strontium manganite) and a lanthanum gallium oxide or cobalt oxide compound doped with such an element (for example, lanthanum strontium cobaltite).

In the present embodiment, not only the anode layer 3 and the cathode layer 2 but also the solid electrolyte substrate is formed in a porous structure. In the prior art, as the solid electrolyte layer was formed in a closely compacted structure, its thermal shock resistance was low, and the solid electrolyte layer easily tended to crack when subjected to rapid temperature changes. Generally, the solid electrolyte layer is formed thicker than the anode layer or the cathode layer; therefore, cracks in the solid electrolyte layer would lead to the formation of cracks in the entire structure of the solid electrolyte fuel cell which would eventually disintegrate in pieces.

When the solid electrolyte substrate is formed in a porous structure, its thermal shock resistance increases, and defects such as cracking do not occur even if the substrate is placed in or near a flame and subjected to rapid temperature changes or is subjected to a heat cycle involving rapid changes in temperature. Further, when the porous structure was fabricated with a porosity of less than 10%, no appreciable improvement in thermal shock resistance was observed, but when the porosity was 10% or higher, good shock resistance was observed, and a better result was obtained when the porosity was increased to 20% or higher. This is presumably because, when the solid electrolyte layer is formed in a porous structure, thermal expansion due to heating is absorbed by the pores in the porous structure.

The solid electrolyte fuel cell is fabricated, for example, in the following manner. First, powders of materials for forming the solid electrolyte layer are mixed in prescribed proportions, and the mixture is molded into a flat plate shape. After that, the flat plate structure is calcined and sintered to produce the substrate which serves as the solid electrolyte layer. Here, by adjusting the kinds and proportions of the powder materials including a pore-forming agent and the calcination conditions such as calcination temperature, calcination time, preliminary calcination, etc., solid electrolyte layers with various porosities can be produced. A paste for forming the cathode layer is applied over one surface of the substrate thus obtained as the solid electrolyte layer, and a paste for forming the anode layer is applied over the other surface thereof; then, the entire structure is calcined to complete the fabrication of the solid electrolyte fuel cell.

The durability of the solid electrolyte fuel cell can be further increased as will be described hereinafter. In this durability increasing method, a metal mesh is embedded in or fixed to each of the cathode layer 2 and the anode layer 3 in the flat plate-like fuel cell C shown in FIGS. 1A and 1B. In the case of the embedding method, the material (paste) for forming each layer is applied over the solid electrolyte layer, and the metal mesh is embedded in the thus applied material, which is then calcined. In the case of the fixing method, the metal mesh is not completely embedded in each layer material but may be fixed to a surface of it, followed by sintering.

For the metal mesh, a material that has excellent heat resistance, and that well matches the thermal expansion coefficient of the cathode layer and anode layer which the metal mesh is to be embedded in or fixed to, is preferred for use. Specific examples include a platinum metal and a platinum-containing metal alloy formed in the shape of a mesh. Alternatively, stainless steel of SUS 300 series (304, 316, etc.) or SUS 400 series (430, etc.) may be used; these materials are advantageous in terms of cost.

Instead of using the metal mesh, metal wires may be embedded in or fixed to the anode layer and the cathode layer. The metal wires are formed using the same metal material as that used for the metal mesh, and the number of wires and the configuration of the wire arrangement are not limited to any particular number or configuration.

The metal meshes or metal wires embedded in or fixed to the anode layer and the cathode layer serve to reinforce the structure so that the solid electrolyte layer cracked due to its thermal history, etc. will not disintegrate into pieces; furthermore, the metal meshes or the metal wires act to electrically connect the cracked portions.

The above description has been given by dealing with the case where the solid electrolyte substrate is formed in a porous structure, but it will be recognized that a closely compacted structure can be employed for the solid electrolyte substrate of the fuel cell of the present embodiment; in this case, the metal mesh or the metal wires embedded in or fixed to the cathode layer and the anode layer provide particularly effective means to cope with the problem of cracking due to thermal history.

The metal mesh or the metal wires may be provided in both the anode layer and the cathode layer or in either one of the layers. Further, the metal mesh and the metal wires may be used in combination. When the metal mesh or the metal wires are embedded at least in the anode layer, if cracking occurs due to thermal history, the power generation performance of the fuel cell does not degrade, and the fuel cell can continue to generate electricity. As the power generation performance of the solid electrolyte fuel cell is largely dependent on the effective area of the anode layer as the fuel electrode, the metal mesh or the metal wires should be provided at least in the anode layer.

In the description so far given, the fuel supply pipes, each provided with a plurality of holes for discharging the combustion fuel, are arranged as shown in FIGS. 1A and 1B so that the plurality of flames formed by combustion are uniformly applied over the entire surface of the anode layer of the plate-like solid electrolyte fuel cell, in order to improve the power generation efficiency of the fuel cell. Next, a description will be given of a simple method of heat utilization employed in the fuel-cell device that uses the solid electrolyte fuel cell according to the present embodiment.

Figure 2:
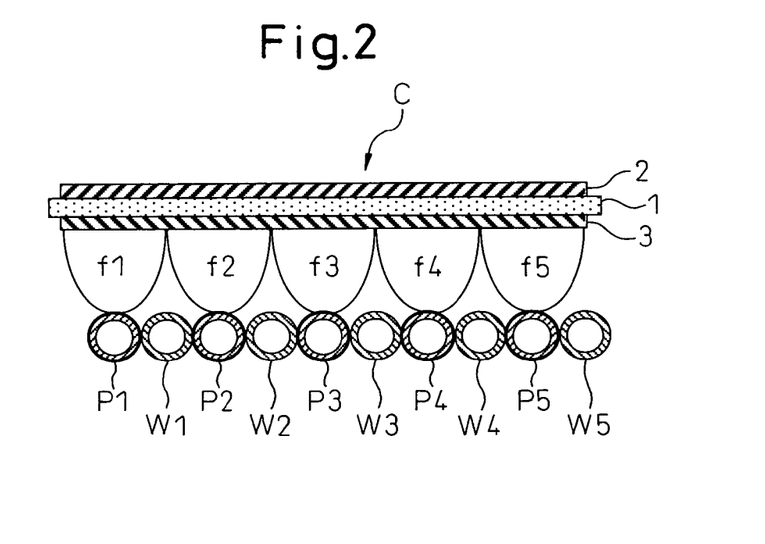
FIG. 2 is a diagram for explaining an embodiment in which the solid electrolyte fuel-cell device according to the present invention is provided with coolant pipes.

FIG. 2 shows a specific example of heat utilization in the solid electrolyte fuel-cell device of the present embodiment. The structure of the solid electrolyte fuel-cell device shown here is fundamentally the same as that of the fuel-cell device shown in FIG. 1; that is, the fuel cell C comprises the cathode layer 2 and the anode layer 3 formed on opposite surfaces of the solid electrolyte substrate 1, and the fuel supply pipes P1 to P5 are arranged on the anode layer 3 side of the fuel cell C so that the flames f1 to f5 formed by the combustion of the supplied fuel are applied to the anode layer 3.

Here, when the fuel supplied from the fuel supply pipes P1 to P5 is burned to form the flames f1 to f5, the fuel supply pipes P1 to P5 themselves are heated, and the temperature rises. Heating the fuel cell C up to a certain point is desirable from the standpoint of improving power generation efficiency, but the heating of the fuel supply pipes themselves is not desirable. Accordingly, in the present embodiment, there is provided a means for conducting the heat away from the fuel supply pipes to lower the temperature of the fuel supply pipes, with provisions made to transport the heat outside the fuel-cell device.

Figure 3A:
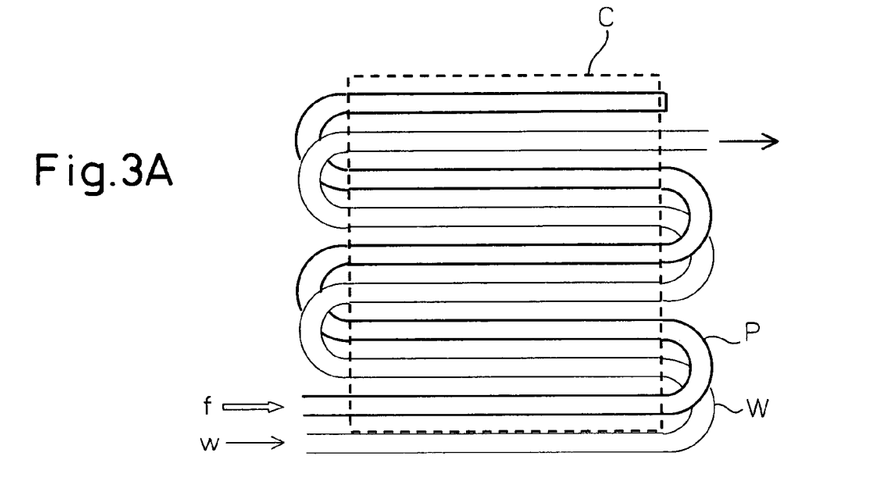
FIGS. 3A and 3B are diagrams for explaining a specific example of a coolant pipe arrangement in the solid electrolyte fuel-cell device according to the present embodiment.
Figure 3B:
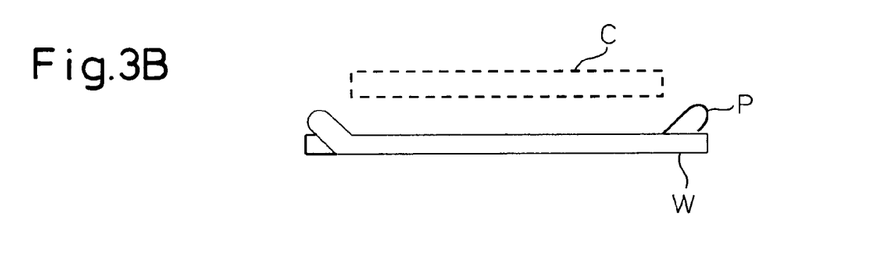

As shown in FIG. 2, coolant pipes W1 to W5 through which a coolant such as water can flow are arranged alternately between the fuel supply pipes P1 to P5 so as to be able to conduct the heat away from the fuel pipes. FIGS. 3A to 3B show one example of the arrangement of the coolant pipe W. While, in FIG. 2, the plurality of separate fuel pipes and the plurality of separate coolant pipes are arranged alternately with each other, in FIGS. 3A and 3B a single continuous fuel supply pipe P and a single continuous coolant pipe W are arranged in an interlaced fashion.

FIG. 3A shows the arrangement viewed from the top. FIG. 3B shows the arrangement viewed from the side. FIG. 3B shows how the fuel supply pipe P and the coolant pipe W are bent; at each bend where the two pipes overlap, one pipe is conveniently bent upward so as to pass over the other. In this way, fuel f is supplied into the fuel supply pipe P located below the fuel cell C, while water w is fed through one end of the coolant pipe W, and heated water w is recovered from the opposite end thereof.

Figure 4:
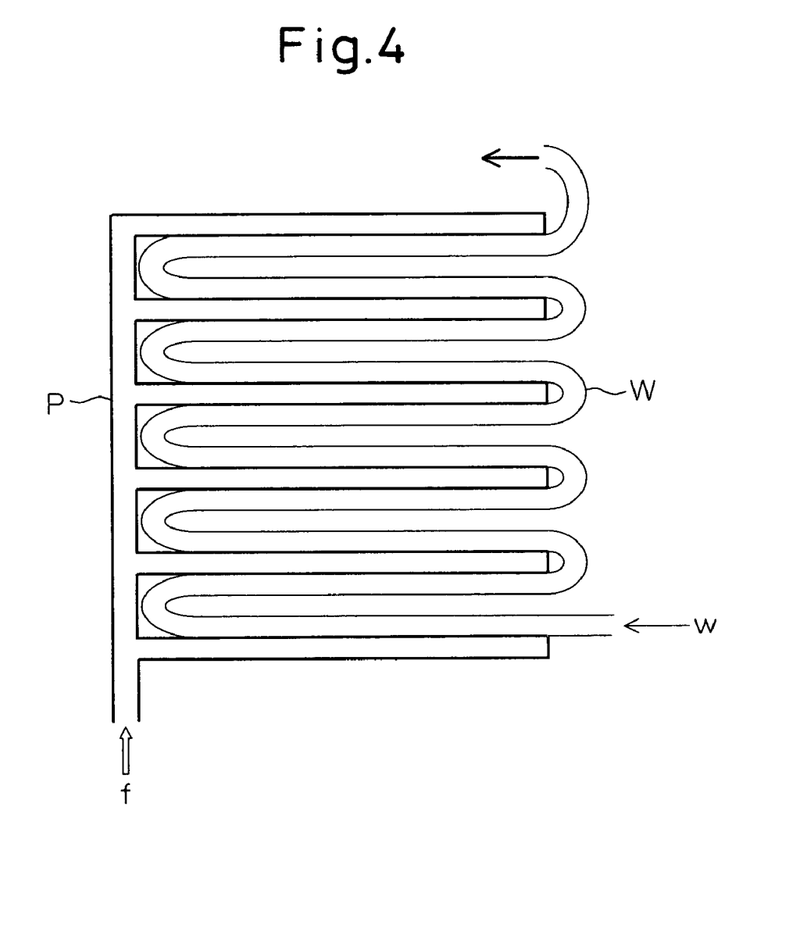
FIG. 4 is a diagram for explaining another specific example of a coolant pipe arrangement in the solid electrolyte fuel-cell device according to the present embodiment.

FIG. 4 shows another example of the arrangement of the fuel supply pipe P and the coolant pipe W. In this case, a plurality of fuel supply pipes are arranged below the fuel cell C as in the case shown in FIG. 1, and each pipe is closed at one end and connected at the other end to the fuel supply pipe P. The fuel f is supplied into the fuel supply pipe P as shown in the figure. The coolant pipe W is a single continuous pipe, which is bent so as to sandwich the fuel supply pipes arranged in a comb-shaped pattern. With this configuration, the water w fed through one end of the coolant pipe W efficiently absorbs the heat from the fuel supply pipes, and the heated water w is recovered from the opposite end thereof.

Figure 5:
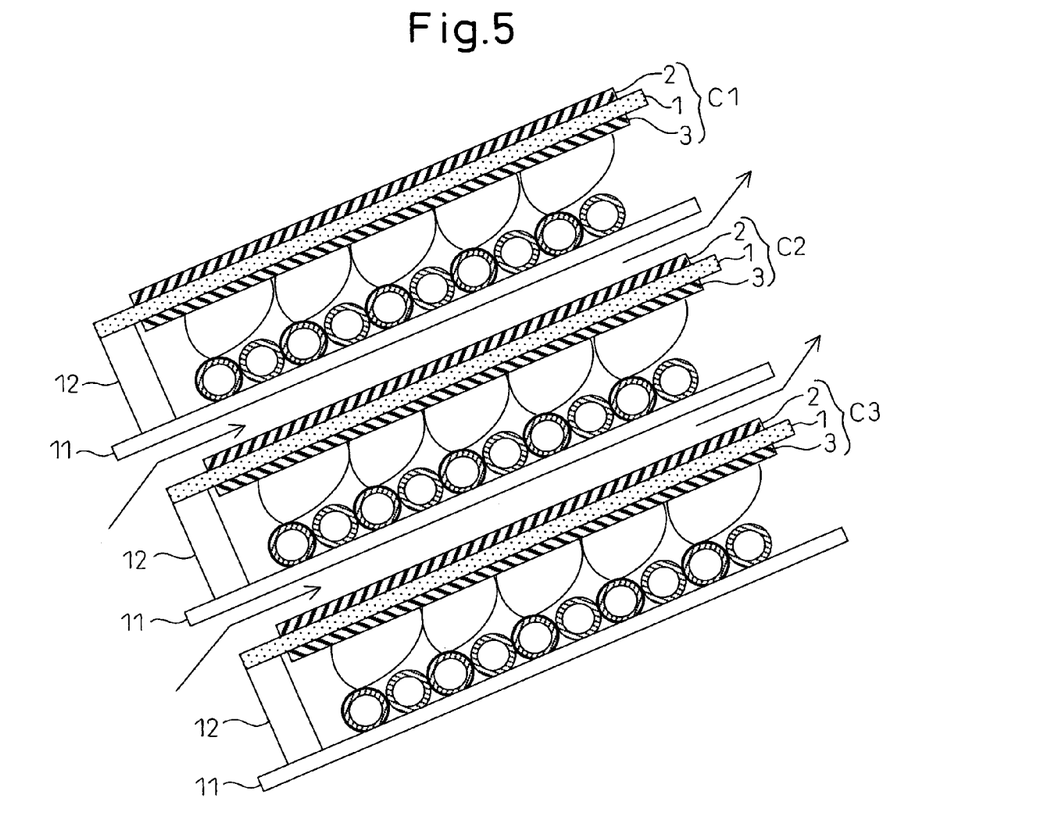
FIG. 5 is a diagram for explaining an embodiment in which solid electrolyte fuel cells, each provided with the coolant pipes according to the present invention, are stacked one on top of another.

Next, a description will be given of a means for increasing power generation output as a fuel-cell device by using the solid electrolyte fuel-cell device of the present embodiment shown in FIG. 2 or FIGS. 3A and 3B. FIG. 5 shows the construction of the solid electrolyte fuel-cell device designed to increase the power generation output. In the solid electrolyte fuel-cell device shown here, a plurality of fuel cell units are constructed, each comprising the fuel cell C with the cathode layer 2 and the anode layer 3 formed on opposite surfaces of the solid electrolyte substrate 1 and the plurality of fuel supply pipes and coolant pipes, like the one shown in FIG. 2, and the plurality of fuel cell units are stacked to increase the power generation output.

When the plurality of fuel cell units are stacked one on top of another, if the fuel supply pipes and coolant pipes in one fuel cell unit are too close to the cathode layer 2 of the lower fuel cell unit, oxygen may not be supplied to the cathode layer 2; therefore, to secure the oxygen supply space above the cathode layer 2, a partition plate 11 is provided on the bottom of the upper fuel cell unit. The upper and lower fuel cell units are arranged with a prescribed spacing provided between the partition plate 11 and the cathode layer 2.

In each fuel cell unit, the fuel supply pipes and the coolant pipes are mounted side by side on the partition plate 11, and a support member 12 is provided between the partition plate 11 and the fuel cell C1-C3 so as to hold the fuel cell C1-C3 a proper distance away from the fuel supply pipes.

In this way, by stacking the plurality of fuel cell units and connecting the respective lead wires accordingly, the power generation output of the fuel-cell device can be increased. However, when the fuel cell units are mounted in a horizontal position, there can occur cases where a sufficient amount of oxygen is not supplied to each cathode layer 2, despite the presence of the gap between the partition plate 11 and the cathode layer 2. In view of this, the plurality of fuel cell units are stacked, each tilted by a prescribed angle from the horizontal, as shown in FIG. 5. In the example shown in FIG. 5, three fuel cell units are stacked, but more fuel cell units can be stacked as needed.

When each fuel cell unit is tilted at a prescribed angle, natural convection of air occurs through the gap between the partition plate 11 and the cathode layer 2, as shown by an arrow in FIG. 5, because of the heat produced by the combustion of the fuel. As a result, fresh air is constantly fed to the cathode layer 2, and the surface of the cathode layer 2 is thus maintained in an oxygen-rich condition, improving the power generation efficiency of the fuel cell.

Further, when each fuel cell unit is tilted at a prescribed angle, if the space between the partition plate 11 and the fuel cell C1-C3 is closed at least at the lower end of the fuel cell unit, for example, by the partition plate 12, the flow of air into the space between the partition plate 11 and the fuel cell C1-C3 can be suppressed; this not only contributes to stabilizing the flames formed by the combustion of the fuel, but also serves to efficiently induce natural convection between the partition plate 11 and the cathode layer 2. Thus, the power generation efficiency of the fuel-cell device can be further increased.

The solid electrolyte fuel cell in the fuel-cell device has been described as using a flat plate-like solid electrolyte substrate, but the shape of the substrate need not necessarily be limited to the flat plate shape; for example, the substrate may be formed in a curved shape or a spherical shape, the only requirement being that the plurality of flames formed by the combustion of the fuel supplied from the plurality of fuel pipes be applied uniformly over the entire surface of the anode layer formed on the substrate.

An example of the solid electrolyte fuel-cell device of the present embodiment so far described will be shown below.

EXAMPLE 1

A substrate of samaria-doped ceria (SDC, $Sm_{0.2}Ce_{0.8}O_{1.9}$ ceramic) with a thickness of 200 μm was used as the solid electrolyte substrate. An SDC paste containing 50% by weight of $Sm_{0.5}Sr_{0.5}CoO_3$ was printed as a cathode layer on one surface of this ceramic substrate, and an SDC paste, to which Li-doped $NiO_2$ containing 5% by weight of $Rh_2O_3$ was added, was printed as an anode layer on the opposite surface thereof; then, the entire structure was calcined at 1200° C.

Next, a platinum mesh produced by welding platinum wires in the form of a mesh was embedded in each printed surface, and the resulting structure was calcined at 1200° C. for one hour in the atmosphere, forming a mesh as a current collecting electrode as well as a crack preventing member, to complete the fabrication of the solid electrolyte fuel cell.

Using a gas burner, a gaseous fuel, i.e., methane, ethane, propane, or butane, was supplied at a flow rate of 400 ml/min. and the premixed flame of the burner was applied to the anode layer of the thus fabricated solid electrolyte fuel cell.

At this time, the solid oxide fuel cell was able to generate power without suffering cracks; when the power generation state was examined, it was confirmed that, in the case of methane gas, the open-circuit voltage was 0.81 V and the output density was 61 mW/cm$^2$. In the case of ethane gas, the open-circuit voltage was 0.81 V and the output density was 71 mW/cm$^2$. In the case of propane gas, the open-circuit voltage was 0.82 V and the output density was 69 mW/cm$^2$. In the case of butane gas, the open-circuit voltage was 0.86 V and the output density was 75 mW/cm$^2$.

Further, when a heat cycle test was conducted on the solid oxide fuel cell by cyclically turning on and off the premixed flame applied to the anode layer, no cracks occurred.

As described above, in the present invention, the fuel cell is constructed by forming the cathode layer and the anode layer on opposite surfaces of the plate-like solid electrolyte substrate; in this fuel cell, as provisions are made to ensure that the flames formed by the combustion of the fuel supplied from the fuel supply pipes are uniformly applied over the entire surface of the anode layer, efficient power generation can be achieved. Furthermore, as the coolant pipes are provided in addition to the fuel supply pipes, not only can the heating of the fuel supply pipes by the combustion of the fuel be suppressed, but the waste heat can be utilized.

Further, when a plurality of fuel cell units, each comprising a fuel cell with a cathode layer and an anode layer formed on opposite surfaces of a plate-like solid electrolyte substrate and a partition plate with fuel supply pipes and coolant pipes mounted thereon, are stacked one on top of another in such a manner as to be tilted from the horizontal, the power generation output of the fuel-cell device can be increased while enhancing the power generation efficiency of the fuel cell.

What is claimed is:

1. A solid electrolyte fuel-cell device comprising:
a solid electrolyte substrate;
a cathode layer formed on one surface of said solid electrolyte substrate;
an anode layer formed on a surface of said solid electrolyte substrate opposite from said one surface;
a plurality of fuel supply pipes, each provided with a plurality of holes, are arranged in parallel to a surface of said anode layer; and a plurality of flames are formed by combustion of a fluid fuel at said plurality of holes; and the entire surface of said anode layer is exposed to said plurality of flames while air is supplied to said cathode layer, thereby causing said fuel cell to generate electricity.

2. A solid electrolyte fuel-cell device as claimed in claim 1, wherein said cathode layer and said anode layer are each formed from a porous material.

3. A solid electrolyte fuel-cell device as claimed in claim 1, wherein a metal mesh or metal wire is embedded in or fixed to a surface of each of said cathode layer and said anode layer.

4. A solid electrolyte fuel-cell device as claimed in claim 1, wherein said plurality of fuel supply pipes are connected together, forming a single continuous flow path for said fluid fuel.

5. A solid electrolyte fuel-cell device as claimed in claim 1, further comprising a plurality of heat exchange medium supply pipes which are arranged in an interlaced fashion between said plurality of fuel supply pipes.

6. A solid electrolyte fuel-cell device as claimed in claim 5, further comprising a partition plate on one surface on which are mounted said plurality of fuel supply pipes and said plurality of heat exchange medium supply pipes, said partition plate being disposed a prescribed distance away from said anode layer.

7. A solid electrolyte fuel-cell device as claimed in claim 6, which is arranged parallel at a prescribed distance to a plurality of solid electrolyte fuel-cell devices, and tilted at a prescribed angle with gravitational direction, and wherein a gap between said partition plate of one of said solid electrolyte fuel-cell device, and said cathode layer of an adjacent one of said solid electrolyte fuel-cell devices provides an air flow passage.

8. A solid electrolyte fuel-cell device as claimed in claim 7, wherein at least a lowermost portion of each said plurality of solid electrolyte fuel-cell devices is closed.

9. A solid electrolyte fuel-cell device as claimed in claim 2, wherein a metal mesh or metal wire is embedded in or fixed to a surface of each of said cathode layer and said anode layer.

* * * * *

UNITED STATES PATENT AND TRADEMARK OFFICE
CERTIFICATE OF CORRECTION

PATENT NO. : 7,470,480 B2
APPLICATION NO. : 10/913339
DATED : December 30, 2008
INVENTOR(S) : Michio Horiuchi et al.

It is certified that error appears in the above-identified patent and that said Letters Patent is hereby corrected as shown below:

Title page First Page, Item [56] Column 2 (Foreign Patent Documents), Line 4, below "JP  06-196176  *  7/1994" delete "JP  06196176  7/1994" (Repeated Entry).

Column 1, Lines 27-37, change "Regarding such fuel according to the method of power generation, one being the type of fuel cell that uses a solid electrolyte. As one example of the fuel cell that uses a solid electrolyte, a fuel cell is known that uses a calcined structure made of yttria ($Y_2O_3$)-doped stabilized zirconia as an oxygen ion conducting solid electrolyte layer. This type of fuel cell comprises a cathode layer formed on one surface of the solid electrolyte layer and an anode layer formed on the opposite surface thereof, and oxygen or an oxygen-containing gas is fed to the cathode layer, while a fuel gas such as methane is fed to the anode layer." to
--Regarding such fuel cells, much research effort has been expended to increase the efficiency and to reduce the cost.
Fuel cells can be classified into various types according to the method of power generation, one being the type of fuel cell that uses a solid electrolyte. As one example of the fuel cell that uses a solid electrolyte, a fuel cell is known that uses a calcined structure made of yttria ($Y_2O_3$)-doped stabilized zirconia as an oxygen ion conducting solid electrolyte layer. This type of fuel cell comprises a cathode layer formed on one surface of the solid electrolyte layer and an anode layer formed on the opposite surface thereof, and oxygen or an oxygen-containing gas is fed to the cathode layer, while a fuel gas such as methane is fed to the anode layer.--.

UNITED STATES PATENT AND TRADEMARK OFFICE
CERTIFICATE OF CORRECTION

PATENT NO.        : 7,470,480 B2
APPLICATION NO.   : 10/913339
DATED             : December 30, 2008
INVENTOR(S)       : Michio Horiuchi et al.

It is certified that error appears in the above-identified patent and that said Letters Patent is hereby corrected as shown below:

Column 6, Line 5, change "0$_2$H," to --O$_2$H,--.

Column 6, Line 32, change "ketons" to --ketones--.

Signed and Sealed this

Thirty-first Day of March, 2009

JOHN DOLL
*Acting Director of the United States Patent and Trademark Office*